(12) United States Patent
Schneider

(10) Patent No.: US 10,192,235 B2
(45) Date of Patent: Jan. 29, 2019

(54) COLLABORATIVE OPTIMIZATION OF ONLINE ADVERTISEMENT RETURN ON INVESTMENT

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1628 days.

(21) Appl. No.: 12/475,408

(22) Filed: May 29, 2009

(65) Prior Publication Data

US 2010/0306025 A1 Dec. 2, 2010

(51) Int. Cl.
*G06Q 20/02* (2012.01)
*G06Q 30/02* (2012.01)
*G06Q 40/00* (2012.01)

(52) U.S. Cl.
CPC ......... *G06Q 30/0242* (2013.01); *G06Q 30/02* (2013.01); *G06Q 30/0246* (2013.01); *G06Q 30/0277* (2013.01); *G06Q 40/12* (2013.12)

(58) Field of Classification Search
CPC ..................................................... G06Q 30/02
See application file for complete search history.

(56) References Cited

U.S. PATENT DOCUMENTS

| | | | | |
|---|---|---|---|---|
| 7,809,801 B1 * | 10/2010 | Wang | ...................... | G06F 15/16 709/217 |
| 2003/0046161 A1 * | 3/2003 | Kamangar et al. | ............. | 705/14 |
| 2008/0103952 A1 * | 5/2008 | Flake et al. | ...................... | 705/37 |
| 2008/0294630 A1 * | 11/2008 | Yan et al. | ........................ | 707/5 |
| 2008/0306830 A1 * | 12/2008 | Lasa | ...................... | G06Q 30/02 705/14.16 |

OTHER PUBLICATIONS

Asela Gunawardana and Christopher Meek, "Aggregators and Contextual Effects in Search Ad Markets", http://research.microsoft.com/apps/pubs/default.aspx?id=69503, WWW 2008, Apr. 21-25, 2008, Beijing China, 5 pgs.
Asela Gunawardana, Christopher Meek and Jody Biggs, "A Quality-Based for Search Ad Markets with Aggregators" ,http://research.microsoft.com/apps/pubs/default.aspx?id=69510,Jun. 1, 2008, 10 pgs.

* cited by examiner

*Primary Examiner* — Patricia H Munson
(74) *Attorney, Agent, or Firm* — Lowenstein Sandler LLP

(57) ABSTRACT

An online advertisement system determines which of a plurality of advertisement clickthroughs are successful online events. A successful online event is based on an advertisement online reference and a success online reference. The system further correlates the number of successful online events for a traffic originator. In addition, the online advertisement system computes an advertisement penalty based on the computed correlation.

8 Claims, 5 Drawing Sheets

COLLABORATIVE OPTIMIZATION OF ONLINE ADVERTISEMENT RETURN ON INVESTMENT

TECHNICAL FIELD

Embodiments of the present invention relate to a method and system for online based advertisements. Specifically, embodiments of the invention relate to collaboratively optimizing online advertisement return on investment.

BACKGROUND

In online advertising, advertisers bid to have online advertisements displayed in online information and pay for these advertisements based on the number of times each advertisement is accessed. For example, an advertiser bids to have a web-based advertisement for a good or service displayed in a web page. Using a pay-per-click model, advertisers pay an advertising platform service when the online advertisement is accessed.

The problem with this business model is that an aggregator can get paid for each and every user action that results in a click to an advertisement the aggregator originates. An aggregator is an entity that aggregates online content and referring links. The aggregator has an incentive to get a user to click on multiple displayed advertisements, irrespective of their utility to the user. This incentive is in conflict to the interests of the users, who wish to maximize utility for each click, and advertisers who have advertisements displayed on an aggregator's site, who wish to maximize user attention on their site (and thus have the incentive to maximize utility for the user). This model also encourages aggregators to pay more than an otherwise equilibrium price for traffic interested in a specific topic. By paying a higher price for advertisements, the advertisement aggregator acts directly against the interests of those competing for that traffic, and ultimately indirectly against the interests of the advertising platform itself, which will suffer by having advertisements for pages of lower utility ranked higher than advertisements for pages of higher utility in their search results.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

An advertisement platform collaboratively optimizes online advertisement return on investment. In particular, in one embodiment, the advertisement platform makes advertisement placement decisions based on a computed penalty for advertisement traffic originators. The computed penalty is based on the number of clickthroughs recorded for a traffic originator compared with the number of online advertisement success action accessed for that traffic originator. A high correlation of clickthroughs as compared with the number of online advertisement success action results in a low (or no) penalty. Conversely, a low correlation of clickthroughs as compared with the number of online advertisement success action results in a high penalty. Furthermore, the advertisement platform determines online advertisement success actions based on an advertisement online reference and a success online reference.

Figure 1:
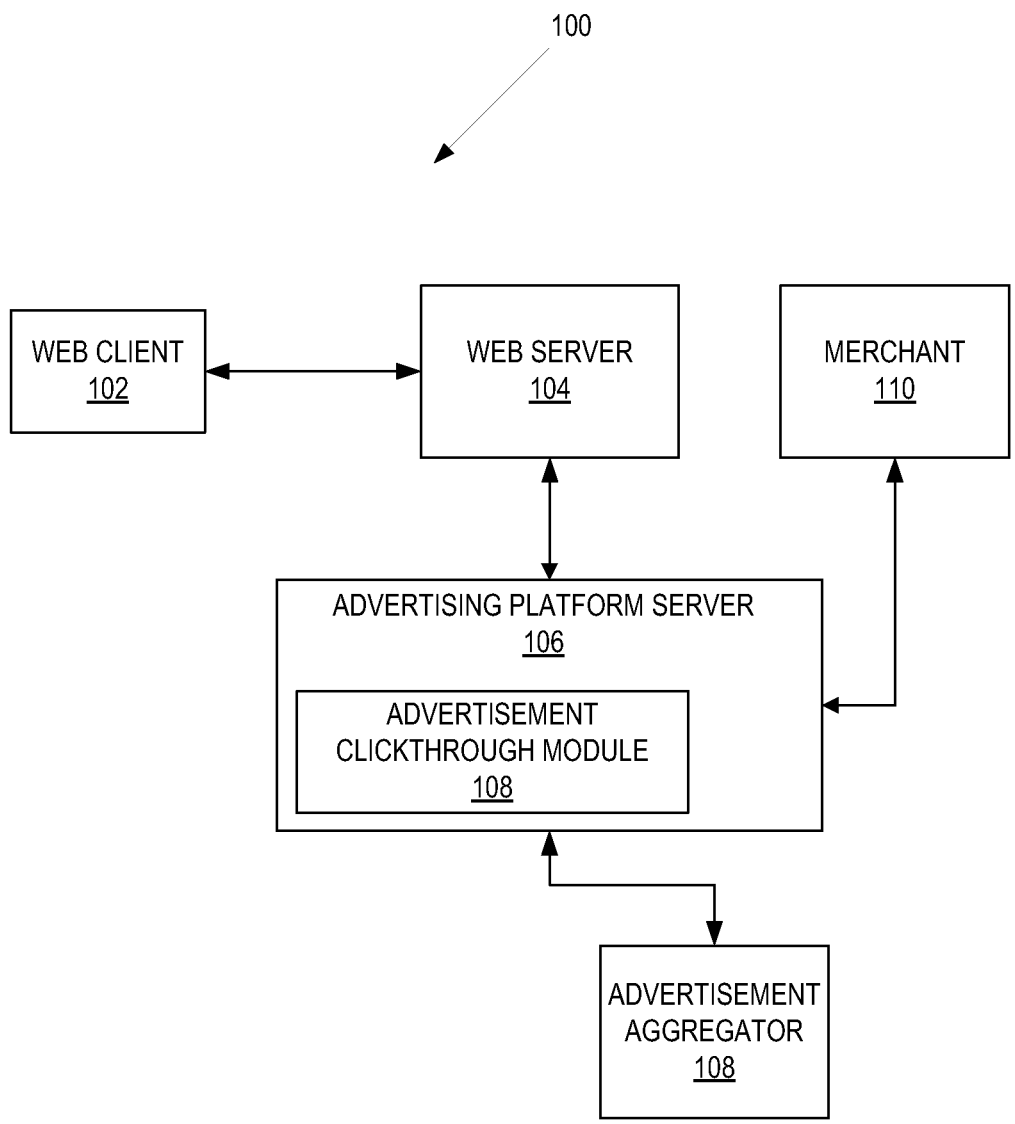
FIG. 1 is a block diagram of one embodiment of an online advertisement system.

FIG. 1 is a block diagram of one embodiment of an online advertisement system 100. Online advertisement system 100 is a system that delivers online advertisements to one or more clients. In one embodiment, online advertisement system 100 is a web based advertisement system that delivers web based advertisements that are inserted in web pages to different web clients. Online advertisement system 100 is composed of client 102, web server 104, merchant 110, advertising platform server 106, and advertisement aggregator 108. Advertising platform server 106 couples to server 104, merchant 110, and advertisement aggregator 108. Merchant 110 supplies the advertisement online and the success online references for advertisements originating from the merchant. Advertisement aggregator 108 is an aggregator is an entity that aggregates online content and referring links. In one embodiment, client 102 is a standard web client as is known in the art and requests web pages include a web advertisement or other type of online advertisement. Client 102 accesses an online advertisements by making a request for that online advertisement through server 104. An online advertisement can be a web advertisement or other type of advertisement accessible online as known in the art. Server 104 receives online information requests from client 102 and transmits online information (e.g., web pages, etc.) to client 102. In addition, server 104 retrieves online advertisements for placement from advertising platform server 106.

Advertisement platform server 106 is a platform that integrates online advertisements from merchant 110 and advertisement aggregator 108 into various web pages. In addition, the advertisement platform server 106 serves advertisements, so that the advertising entities (merchant, advertisement aggregator, etc.) can realize a return on investment for the advertisement being displayed via advertising platform server 106. In one embodiment, success of an online advertisement access is measured in part by recording the number of clickthroughs for the advertisement.

Advertisement platform server 106 determines which advertisements to place in the online information. In one embodiment, advertisement platform server 106 makes advertisement placement decisions based on bids as in a pay-per-click model and based on a penalty function. In this embodiment, advertisement platform server 106 computes the penalty function based on the correlation between the number of clickthroughs for a traffic originator's advertisement and the number of online advertisement success actions calculated for that traffic originator. Online advertisement success actions are defined below. A traffic originator is an entity that supplies the online information for advertisement platform server 106, such as merchant 110 and advertisement aggregator 108.

On one hand, traffic originators with high correlation of online advertisement success actions have a low penalty function. In one embodiment, a high correlation can result from a traffic originator that has an online advertisement that is closely tied to content on that traffic originators web site. For example and in one embodiment, merchant 110 supplies a success reference that is likely to be accessed by client 102 after client 102 accesses the associated advertisement. Alternatively, a high (or very high) correlation of success can have a reward function, which boosts advertisements placements for that traffic originator. On the other hand, traffic originators with low correlation of online advertisement success actions have a high penalty function. In one embodiment, a low correlation can result from a traffic originator that has an online advertisement that is loosely tied or have no ties to the content on that traffic originators web site. For example and in one embodiment, advertisement aggregator 108 aggregates different content which can lead client 102 away from accessing the success reference. In this example, an advertisement from advertisement aggregator 108 may be for a handbag that links to an aggregating site to displays content regarding a wide range of information, such as men's scuba wallet, that may or may not relate to handbags. Thus, it is more likely that client 102 will not complete a online advertisement success action after accessing an advertisement.

Advertising platform server 106 measures online advertisement success actions. In this embodiment, a online advertisement success action is based on an online advertisement reference and an online success reference. In one embodiment, each of the references is a uniform resource locator (URL). In this embodiment, advertising platform server 106 tracks online accesses by client 102 to determine if client 102 access a success online reference after accessing an advertisement. Upon client 102 reaching this success online reference, an online advertisement success action is recorded. The success online reference represents the traffic originator's successful completion of the advertising cycle. In one embodiment, this success online reference can be a thank you reference, registration web page, acknowledgment web page, download page, etc. A clickthrough is an access of an advertisement, such as a user clicking on a web advertisement.

Advertising platform server 106 can track traffic from source through destination in a variety of ways. For example and in one embodiment, advertising platform server 106 can track traffic with cookies. In this embodiment, the links provided by the advertiser would be "wrapped" in URLs that go through advertising platform server 106. In this example, merchant 110 has a landing page of http://www.merchant.example.com/landing and a "success" page of http://www.merchant.example.com/success, where "success" indicates a purchase action. Merchant 110 submits these URLs to the advertising platform, and gets back a "wrapped" success URL (e.g., http://www.adplatform.example.com/merchant.example.com/success). The merchant 110 uses this "wrapped" URL as the page for checkouts. The incoming link would be managed as a redirect via advertising platform server 106—as part of this redirect, the advertising platform server 106 would issue a cookie to the browser. When the browser in client 102 subsequently requests the "wrapped" success URL, the browser returns the cookie to the advertising platform server 106, which can then correlate the behaviors. Other tracking methodologies are possible (e.g., requiring web beacons on the success landing page, embedding session IDs into dynamically generated URLs, etc.).

In another embodiment, a user agent (e.g., a browser) is under no obligation to accept cookies, and may not return them to the server. This is more likely in the case of "advertisement tracking cookies". To make it more likely that these cookies be accepted, advertisement platform server 106 uses session cookies (cookies that expire when the user closes their browser). Furthermore, in another embodiment, to account for a browser does not accept the cookie, advertisement platform server 106 can use a double redirect technique as is known in the art A double redirect technique works by having the click-through URL issue a cookie to the user agent, and then redirect to a cookie counting URL on the advertisement platform server 106, which ultimately redirects the user agent to the advertiser landing page. At the cookie counting URL, if the user agent does not return the cookie, the advertisement platform server 106 counts a clickthrough for its revenue purposes, but that clickthrough would not be counted in the correlation calculations.

In a further embodiment, by using a session cookie, advertisement platform server 106 may not track some online advertisement success actions back to a particular advertising source. This is because it is possible for a user to click on an advertisement, bookmark the landing page, close the browser, and revisit the site at a later time. The act of closing the browser discards the tracking cookie.

In one embodiment, advertising platform server 106 provides a link to use in place of the success on reaching the replacement link and advertisement. Server 104 redirects client 102 to the online success reference and records an online advertisement success action for the traffic originator of the advertisement. This embodiment is used when advertising platform server 106 is performing a partial match on the success online reference, such as query string matching described below in FIG. 2. By doing this, advertising platform server 106 is able to correlate online advertisement success actions by the traffic originator.

Advertisement platform server 106 ranks online advertisement success actions based on the percentage of traffic that reaches the success stage. Once enough statistical information is available, advertising platform server 106 can make placement decisions to increase the overall average success rate of the advertisers. For example and in one embodiment, advertisement platform server 106 utilizes the penalty function to boost advertisement placements of merchant 110 advertisements and discourage placement of advertisements from advertisement aggregator 108. By boosting the placement of merchant 110 advertisements, merchant 110 can realize a greater return on investment for the advertisements because these advertisement have greater visibility and potentially a lower bid than the advertisement from advertisement aggregator 108.

In one embodiment, advertising platform server 106 can make individual advertiser statistics and aggregate statistical profiles available to merchant 110 and aggregator 108. For example and in one embodiment, advertising platform server 106 makes available individual statistics to the advertisers, such as advertisement X of merchant 110 has a success correlation of 0.5. As another example and in another embodiment, advertising platform server 106 makes available aggregate statistics to the advertisers, such as advertisement Y of aggregator 108 has a success correlation of 0.02 compared to an average success correlation of 0.3 for all advertisements considered for the same advertising slots.

Figure 2:
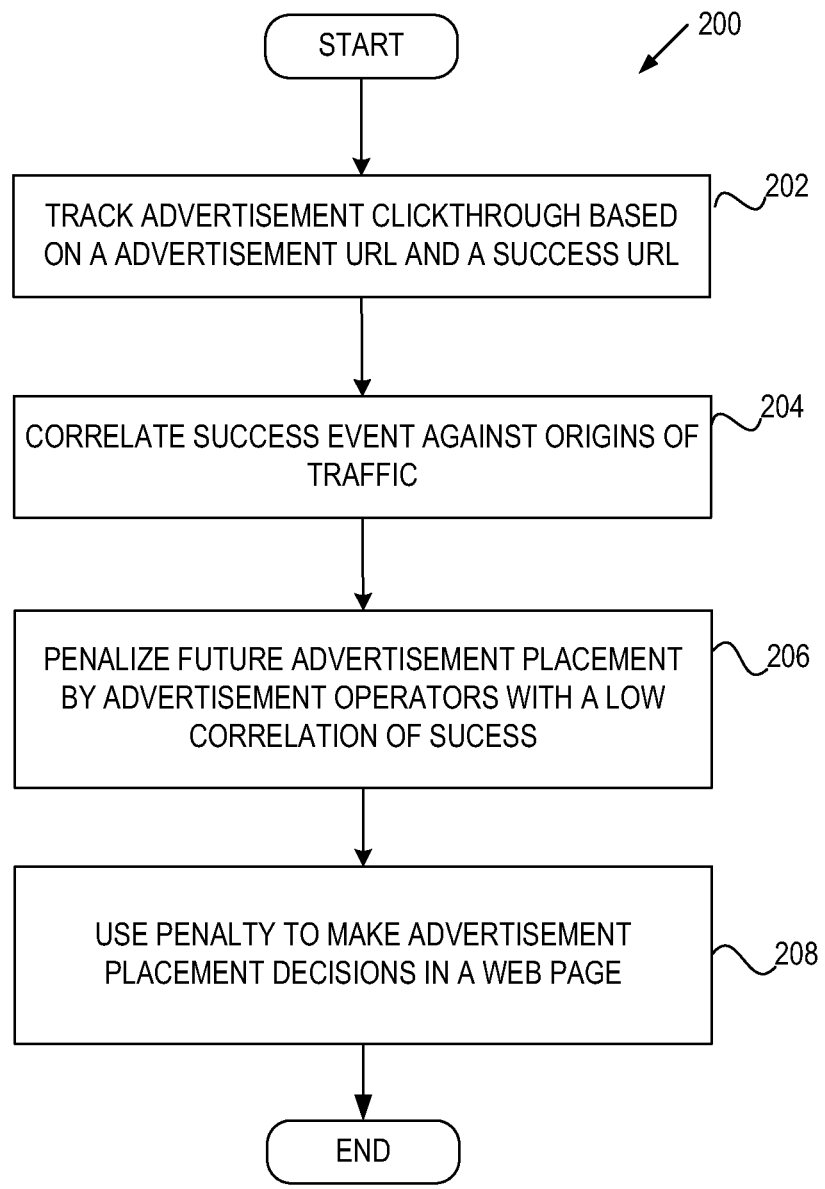
FIG. 2 is a flowchart diagram of one embodiment of a process for collaboratively optimizing an online advertisement return on investment.

FIG. 2 is a flowchart diagram of one embodiment of a process 200 for collaboratively optimizing online advertisement return on investment. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 200 is performed by an advertisement clickthrough module in an advertisement platform server, such as advertisement clickthrough module 112 of FIG. 1.

Referring to FIG. 2, process 200 begins by determining online advertisement success actions based on an online advertisement reference and an online success reference at block 202. For example in one embodiment, process 200 receives web page requests for an advertisement URL and tracks successive web page requests from the web page of the client that made the initial advertisement URL request. If a subsequent web page request is one of the success of web page requests is equal to the success reference, process 200 record this as a online advertisement success action for that traffic originator. Determining the online advertisement success action based on an online advertising reference and a success reference is further described in FIG. 3 below.

At block 204, process 200 correlates online advertisement success actions against the traffic originator. For example and in one embodiment, process 200 matches up online advertisement success actions reported in block 202 above against online advertisement requests for the traffic originator.

At block 206, process 200 computes a penalty for future advertising placement by advertising operators with a low correlation of success. For example and in one embodiment, an advertisement aggregator can have a low correlation success because the advertisement aggregator advertisements reference content not related to the advertisement. Thus, there is less likelihood that advertisement aggregator advertisements will lead to the success online reference. As a result, advertisement aggregator will have a larger penalty in comparison to merchant.

In one embodiment, a penalty function can use multiple types of data. For example and in one embodiment, each advertisement and matching advertising opportunity have a correlation. In addition, each advertisement can be inserted into a finite number of available advertising opportunities. Furthermore, if there are more advertising opportunities than available insertions of a particular advertisement, advertisements can be distributed into the available insertions slots with high correlation. A calculation in this embodiment is in part a probabilistic calculation. This is because while process 200 would generally have information on how many times a particular advertisement can be inserted into available opportunities, process 200 may not know exactly how many advertising opportunities will exist that could theoretically be filled with a particular advertisement.

In one embodiment, a basic model can be used by process 200 for making these placement decisions. In this embodiment, process 200 would compute three different probabilities. Process 200 computes a probability to each particular advertisement that can be displayed in a given slot that is computed based on the correlation for that advertisement and that slot, a probability for the number of available insertions for that advertisement, and a probability that a better match will occur "soon."

In one embodiment, a simple model for the better match probability would be to track the sequence of advertising opportunities matching a particular advertisement, and calculating the distribution of "better" opportunities within some time parameter. For example and in one embodiment, if an advertisement has correlations of 0.01 with site A, and 0.05 with site B, and site B has in the past shown up within 10 seconds (or 10 page views, some other time parameter, etc.) of site A with a probability of 0.75, the "raw" correlation with site A would be modified to reflect the high probability that a better opportunity is just around the corner. In this case, the correlation could be scaled by the probability that A is the best choice in this instance (which would be 0.25, the probability that B does not show up in the time frame being considered).

In this embodiment, process 200 can be complicated by multiple possible advertisement placement opportunities. In this embodiment, it may be better for process 200 to scale the correlation by a weighted average fitness function. Extending the example above, assume that an advertisement matches site A with a correlation of 0.01, site B with 0.05, and site C with 0.02. Further, assume that site A is followed by a site B in the "soon" time frame under consideration in 0.75 of the cases tracked, and followed by site C in 0.33 of the cases. For this advertisement, the utility of displaying it at site A is 0.01 (its raw correlation). The utility of not displaying it in favor of site B would be 0.0375, and the utility of not displaying it in favor of site C would be 0.0066. When combining the following utility values, process 200 will have high following utility values (with respect to the current utility value) that decrease the current utility value, whereas low following utility values would increase the current utility values. For example, the B utility value should decrease the current utility value, and the C utility value should increase it.

In one embodiment, process 200 can combine these values by calculating a scaling factor for each following possible placement utility. If the utility for the current opportunity is "x", and the utility for a particular following opportunity is "y", the scaling factor can be calculated as $f=(1-y)*x/y$. These scaling factors are all multiplied by the current opportunity utility, and this is the final probabilistic utility for the given opportunity for a particular advertisement. For the example sites A, B, and C above, this gives a utility of 0.003863.

To use this improved embodiment for advertisement placement, process 200 calculates the utility for each advertisement in a given opportunity. This utility value is combined with the number of available insertions, and turned into a probability. In one embodiment, process 200 multiplies the utility values by the available insertion values, and calculates a probability value from the ratio of a particular advertisement's product with the sum of all of the products. Continuing the example above, if the advertisement with a calculated utility value of 0.003863 has three available insertions, an advertisement with a calculated utility value of 0.003171 has four available insertions, and an advertisement with a calculated utility value of 0.001171 has 10 available insertions, the scaled utility values would be 0.011589, 0.012684, and 0.01171, with probabilities of 0.3221, 0.3525, and 0.3254, respectively.

Note that this embodiment may not take revenue considerations into account. The scaled utility values could be multiplied by the bid amount of the advertisement before calculating the probabilities. Continuing the example above, assume that the advertisements had bid values of $0.35, $0.15, and $0.85, respectively. This would lead to adjusted scaled values of 0.004056, 0.001903, and 0.009954, respectively, leading to probabilities of 0.2549, 0.1196, and 0.6255, respectively.

In one embodiment, process 200 can do most of the calculations once and the results can be cached. These results can be updated when correlations are updated system-wide, or when advertisement bids are changed.

In this embodiment, process 200 will place an advertisement in every slot. However, the advertisements placed in each slot should correlate more closely with the effectiveness of the advertisement in that slot. An improvement to this embodiment is to create an incentive for poor advertising opportunities to improve. In an improved embodiment, process 200 calculates the revenue share of the advertisement platform with the advertising opportunity owner using the correlation of the advertisements in each slot. In one embodiment, the improved process 200 uses the correlation as the revenue share amount.

In another embodiment, a further improved approach has process 200 scaling the correlation of a particular advertisement displayed in a particular slot by the average correlation of that advertisement over every slot in which it is displayed. For values less than 1, process 200 multiplies directly with the standard revenue share amount. For values more than one, process 200 scales (and possibly range limits) the scaling multiplier. For example and in one embodiment, an advertisement might have an average correlation of 0.03. In slot A, it might have a correlation of 0.01, meaning that the owner of slot A would only get a third of the standard revenue share for clicks in that slot. In slot B, it might have a correlation of 0.09. Since three times the standard revenue share is likely to be uneconomic for the advertising platform, this value is scaled and limited. For example and in one embodiment, the amount of the scaled correlation over 1 is be divided by 100, and that result used as a bonus revenue share, with a limit of no more than double of the standard revenue share.

In the further improved embodiment, process 200 uses initial correlation values assigned to new advertisements and new advertising opportunities. Both of these values are given "average" correlation values until enough data has been collected to calculate values based on the collected data. In one embodiment, process 200 uses minimum values for clickthrough and success counts when the clickthrough value is below that minimum. For example, if it is determined that a new advertisement should have a minimum clickthrough count of 1000 and a minimum success count of 15, the correlation calculation for the advertisement would use 1000 for the clickthrough count as long as the true count was below 1000, and it would use 15 for the success count as long as the true success count was below 15 and the true clickthrough count was below 1000.

At block 208, process 200 uses the computed penalty to make advertisement placement decisions in a web page. For example in one embodiment, advertisements from advertiser aggregator with a large penalty fare are less likely to be placed in a web page as compared with an advertisement from a merchant that has a low (or no) penalty or reward. Because the advertisement is more likely to be seen and accessed by a client, the merchant advertisement will be more successful than a less accessed advertisement for an advertisement aggregator. In this embodiment the advertisement aggregators advertisements will be penalized because of the low correlation of success. In the long run, process 200 will drive out the advertisement aggregators advertising scheme.

In addition, process 200 can use clickthrough rates in considering which advertisements to place. In this embodiment, an advertisement with a bid of $1 and a clickthrough rate of 0.001 will rank lower than an advertisement with a bid of $0.10 and a clickthrough rate of 0.02. For this embodiment, process 200 would modify the placement calculations for the advertisement by multiplying the bid amount by the clickthrough rate (either for that particular slot, or over placement of all advertisements), instead of just using the bid amount and the penalty/rewards as described above.

Figure 3:
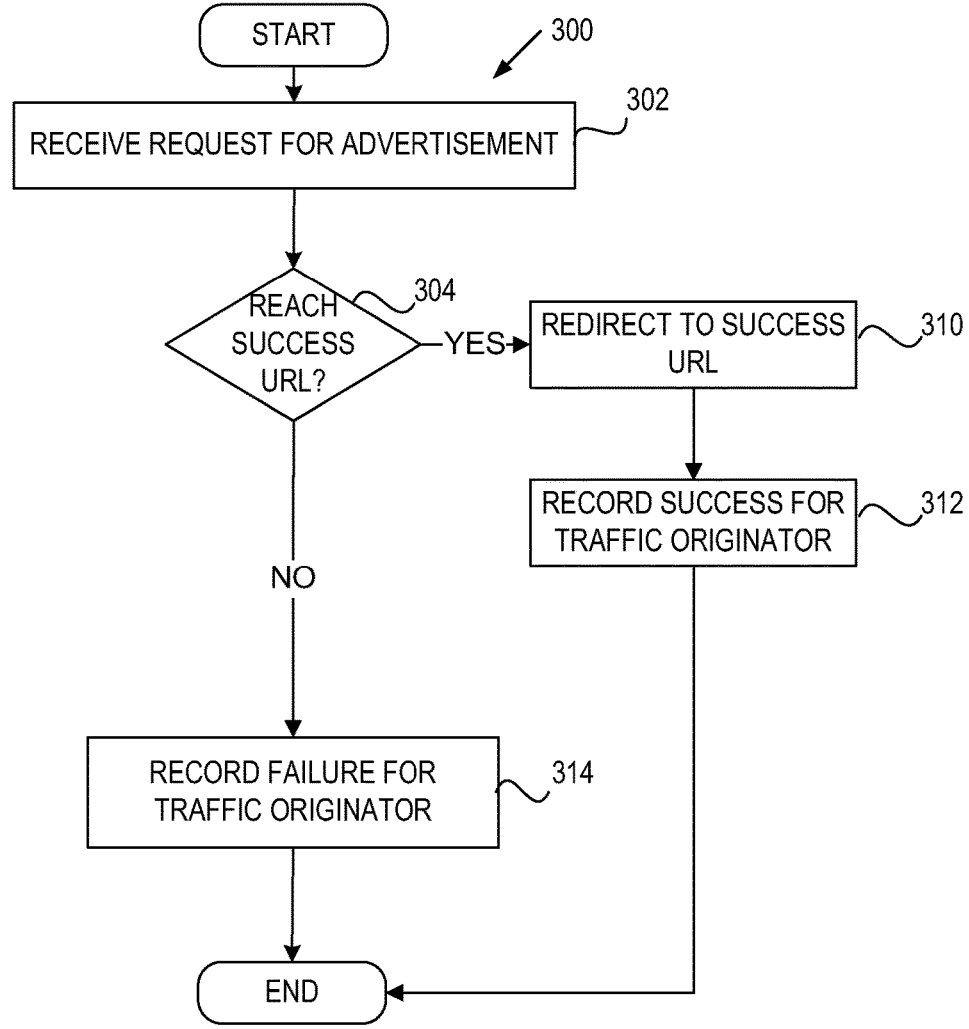
FIG. 3 is a flowchart of one embodiment of a process for determining an online advertisement success action based on an online advertisement reference and an online success reference.

FIG. 3 is a flowchart of one embodiment of a process for determining an online advertisement success action based on an advertisement online reference request and a success online reference request. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 200 is performed by an advertisement clickthrough module in an advertisement platform server, such as advertisement clickthrough module 112 of FIG. 1.

Referring to FIG. 3, process 300 begins by receiving a request for an advertisement online reference at block 302. Furthermore, process 300 transmits that online advertisement to the client making this request. In this embodiment, process 300 starts the tracking cycle to determine if the advertisement request leads to a online advertisement success action. Process 300 determines if the request would page request is any request for a success at block 304. In one embodiment process 300 matches with the success URL versus the web page request in another embodiment the web page request matching is based on a query string preserving match. In one embodiment, a query string preserving match matches characters to the left of the "?" in a web page request URL. For example and in one embodiment, a web page request URL could be "http://www.exampleHBstore.com/order/hbstyle1/?orderid". In this example, process 300 matches the text to the left of the "?", which is "http://www.exampleHBstore.com/order/hbstyle1/" with the success URL. In this embodiment, characters to the right of the "?" are not used in the matching. In another embodiment, the match for success URL is based on a path information preserving match. For example and in one embodiment, the match is based on including the path after the domain name.

If this online reference request matches the online success reference, process 300 redirects the online reference request to the success reference at block 310. At block 312, process 300 records a online advertisement success action for the traffic originator associated with the initial advertisement request.

If the online requests does not match to the online success request, process 300 records a failure for the traffic originator at block 314. Alternatively, process 300 does not record a failure and ceases tracking for this advertisement request.

Figure 4:
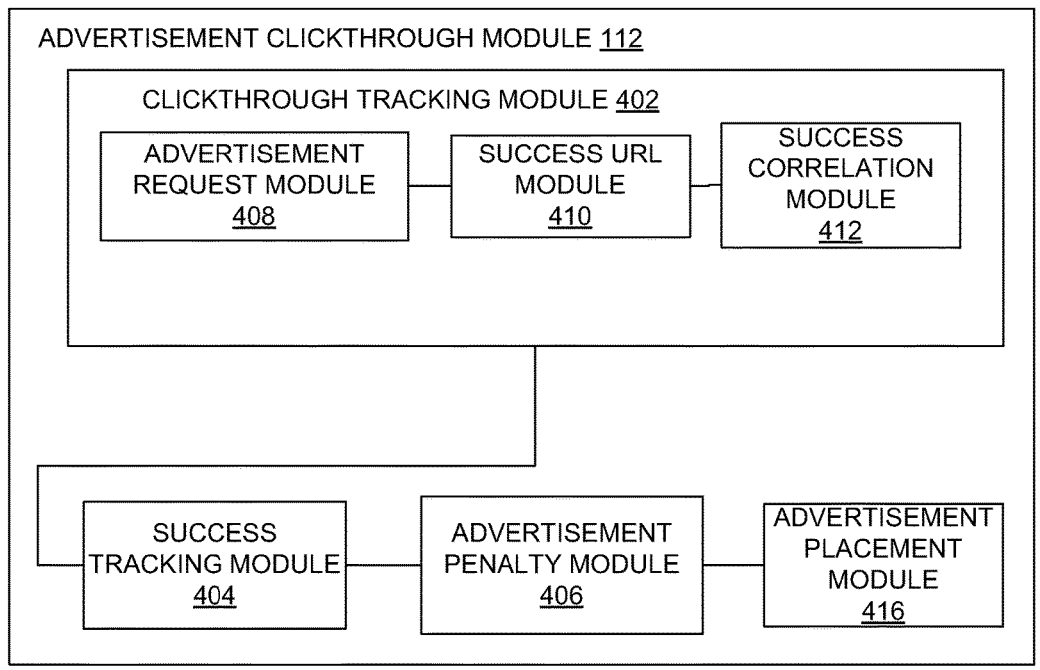
FIG. 4 is a block diagram of an advertisement click-through module that collaboratively optimizes online advertisement return on investment.

FIG. 4 is a block diagram of an advertisement clickthrough module 112 that collaboratively optimizes online an advertisement return on investment. Advertisement clickthrough module 112 is composed of clickthrough tracking module 402, success tracking module 404, advertisement penalty module 406, and advertisement placement module 416.

Clickthrough tracking module 402 determines online advertisement success actions as described in FIG. 2, block 202 and FIG. 3. Success tracking module 404 correlates online advertisement success actions against traffic originators as described in FIG. 2, block 204. Advertisement penalty module 406 computes a penalty for the traffic originators as described in FIG. 2, block 206. Advertisement placement module 416 makes advertisement placement decisions as described in FIG. 2, block 208.

Clickthrough tracking module 402 is composed of advertisement request module 408, success URL module 410, and success correlation module 412. Advertisement request module 408 receives an advertisement requests as described in FIG. 3, block 302. Success URL module 410 determines if an online request matches a success reference as described in FIG. 3, block 304. Success correlation module 412 record a online advertisement success action for a traffic originator as described in FIG. 3, block 312.

Figure 5:
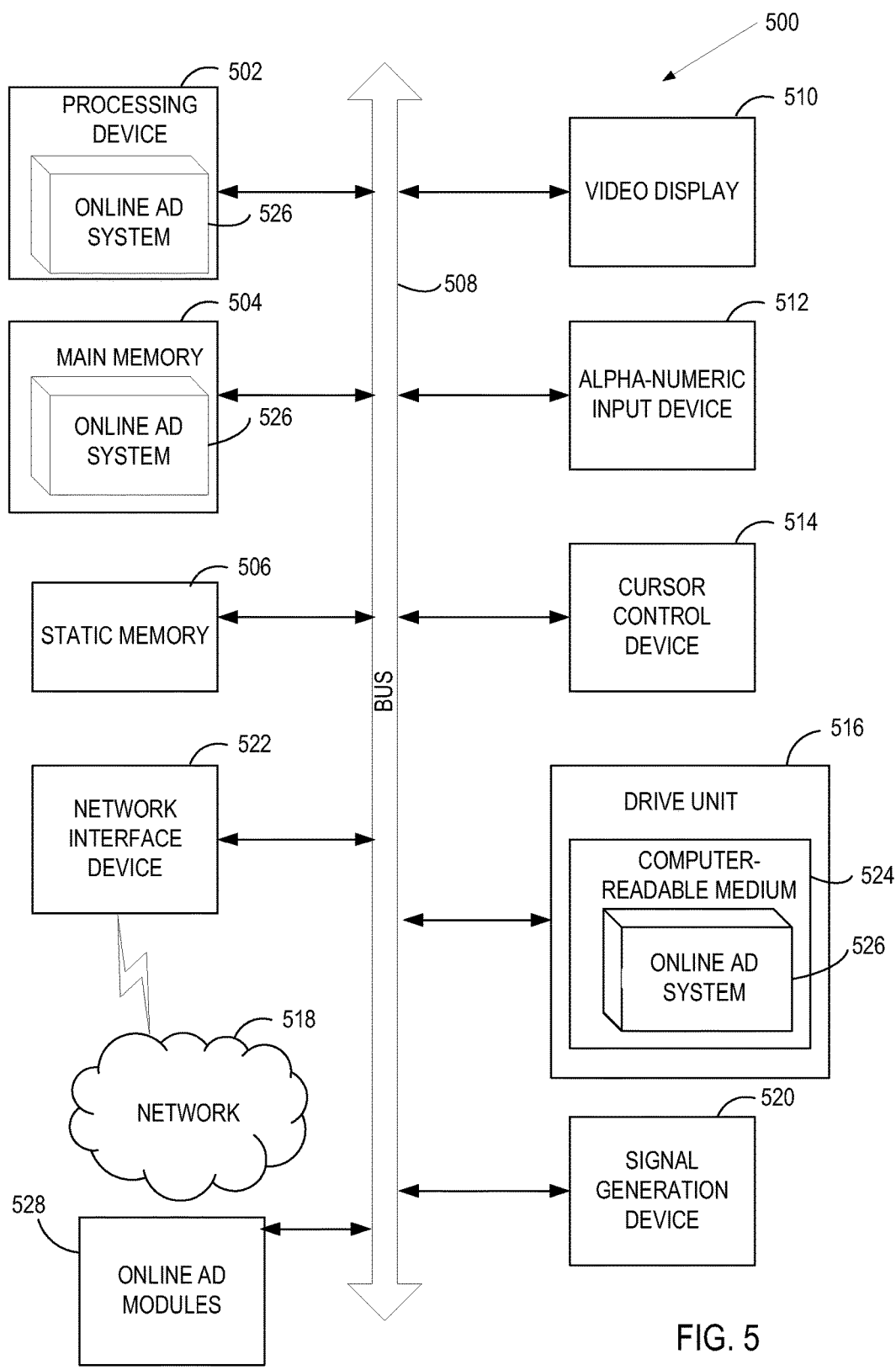
FIG. 5 is a diagram of one embodiment of a computer system for collaboratively optimizing online advertisement return on investment.

FIG. 5 is a diagram of one embodiment of a computer system 500 for collaboratively optimizing online advertisement return on investment. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer accessing online information and the server computer collaboratively optimizing online advertisement return on investment) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the advertisement platform system 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., the advertisement platform system 526) embodying any one or more of the methodologies or functions described herein. The advertisement platform system 526 may also reside, completely or at least partially, within the main memory 504 and/or within the processing device 502 during execution thereof by the computer system 500, the main memory 504 and the processing device 502 also constituting machine-readable storage media. The advertisement platform system 526 may further be transmitted or received over a network 518 via the network interface device 522.

The computer-readable storage medium 524 may also be used to store the advertisement platform system 526 persistently. While the computer-readable storage medium 526 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 528, components and other features described herein (for example in relation to FIG. 1) can be implemented as discrete hardware components or integrated in the functionality of hardware components such as ASICS, FPGAs, DSPs or similar devices. In addition, the modules 528 can be implemented as firmware or functional circuitry within hardware devices. Further, the modules 528 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "computing," "determining," "matching," "correlating," "receiving," "recording," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for collaboratively optimizing online advertisement return on investment been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving, from an advertiser system, a uniform resource locator (URL) designating a success online reference web page wherein a successful online advertisement event occurs when a client accesses the success online reference web page after accessing an advertisement online reference web page;
determining, by the processing device, a correlation value by matching a quantity of clickthroughs associated with a traffic originator and a plurality of successful events associated with the traffic originator, wherein the correlation value represents a revenue share amount associated with the traffic originator;
storing the correlation value in cache of the server;
computing, by the processing device, an advertisement placement penalty associated with the traffic originator, wherein a low correlation value results in a high advertisement placement penalty and a high correlation value results in a low advertisement placement penalty;
receiving, by the processing device from the traffic originator, a bid value associated with a first webpage;
adjusting, by the processing device, the bid value in view of the advertisement placement penalty to identify an adjusted bid value;
determining, by the processing device, a scaling factor associated with an online advertisement, the scaling factor representing a first utility value scaled in view of a first number of insertion points available to display the online advertisement on the first webpage and a second utility value scaled in view of a second number of insertion points available to display the online advertisement on a second web page, wherein the second web page occurs after the first web page in an identified sequence;
causing, by the processing device, a display of the online advertisement on one of the first web page or the second web page in view of the adjusted bid value multiplied by the scaling factor;
receiving, in response to the display of the online advertisement, a request for the online advertisement comprising a first URL string; and
determining, using query string preserving matching, the first URL string matches the URL designating the success online reference web page.

2. The method of claim 1, further comprising:
recording success for the traffic originator in view of the first URL string matches the URL designating the success online reference web page.

3. The method of claim 2, wherein the online advertisement is a web page advertisement.

4. A non-transitory computer readable storage medium having instructions stored thereon that, when executed by a processing device, cause the processing device to:
receive, from an advertiser system, a uniform resource locator (URL) designating a success online reference web page wherein a successful online advertisement event occurs when a client accesses the success online reference web page after accessing an advertisement online reference web page;
determine, by the processing device, a correlation value by matching a quantity of clickthroughs associated with a traffic originator and a plurality of successful events associated with the traffic originator, wherein the correlation value represents a revenue share amount associated with the traffic originator;
store the correlation value in cache of the server;
compute, by the processing device, an advertisement placement penalty associated with the traffic originator, wherein a low correlation value results in a high advertisement placement penalty and a high correlation value results in a low advertisement placement penalty; and
receive, by the processing device from the traffic originator, a bid value associated with a first webpage;
adjust, by the processing device, the bid value in view of the advertisement placement penalty to identify an adjusted bid value;

determine a scaling factor associated with an online advertisement, the scaling factor representing a first utility value scaled in view of a first number of insertion points available to display the online advertisement on the first webpage and a second utility value scaled in view of a second number of insertion points available to display the online advertisement on a second web page, wherein the second web page occurs after the first web page in an identified sequence;

cause, by the processing device, a display of the online advertisement on one of the first web page or the second web page in view of the adjusted bid value multiplied by the scaling factor receive, in response to the display of the online advertisement, a request for the online advertisement comprising a first URL string; and determine, using query string preserving matching, the first URL string matches the URL designating the success online reference web page.

5. The computer readable storage medium of claim 4, the processing device to:

record success for the traffic originator in view of the first URL string matches the URL designating the success online reference web page.

6. The computer readable storage medium of claim 5, wherein the online advertisement is a web page advertisement.

7. A system comprising:

a memory; and a processing device operatively coupled to the memory, the processing device to:

receive, from an advertiser system, a uniform resource locator (URL) designating a success online reference web page wherein a successful online advertisement event occurs when a client accesses the success online reference web page after accessing an advertisement online reference web page;

determine, by the processing device, a correlation value by matching a quantity of clickthroughs associated with a traffic originator and a plurality of successful events associated with the traffic originator, wherein the correlation value represents a revenue share amount associated with the traffic originator;

store the correlation value in cache of the server;

compute, by the processing device, an advertisement placement penalty associated with the traffic originator, wherein a low correlation value results in a high advertisement placement penalty and a high correlation value results in a low advertisement placement penalty; and receive, by the processing device from the traffic originator, a bid value associated with a first webpage;

adjust, by the processing device, the bid value in view of the advertisement placement penalty to identify an adjusted bid value;

determine a scaling factor associated with an online advertisement, the scaling factor representing a first utility value scaled in view of a first number of insertion points available to display the online advertisement on the first webpage and a second utility value scaled in view of a second number of insertion points available to display the online advertisement on a second web page, wherein the second web page occurs after the first web page in an identified sequence;

cause, by the processing device, a display of the online advertisement on one of the first web page or the second web page in view of the adjusted bid value multiplied by the scaling factor receive, in response to the display of the online advertisement, a request for the online advertisement comprising a first URL string; and determine, using query string preserving matching, the first URL string matches the URL designating the success online reference web page.

8. The system of claim 7, the processing device to:

record success for the traffic originator in view of the first URL string matches the URL designating the success online reference web page.

\* \* \* \* \*